(12) United States Patent
Yang

(10) Patent No.: US 7,616,538 B2
(45) Date of Patent: Nov. 10, 2009

(54) METHOD FOR SETTING LAYER-JUMP POINT ON OPTICAL DISC

(75) Inventor: Sung-Wei Yang, Taipei (TW)

(73) Assignee: VIA Technology, Inc., Taipei (TW)

( * ) Notice: Subject to any disclaimer, the term of this patent is extended or adjusted under 35 U.S.C. 154(b) by 581 days.

(21) Appl. No.: 11/589,973

(22) Filed: Oct. 31, 2006

(65) Prior Publication Data
US 2008/0019235 A1 Jan. 24, 2008

(30) Foreign Application Priority Data
Jul. 5, 2006 (TW) .............................. 95124552 A

(51) Int. Cl.
*G11B 7/00* (2006.01)
(52) U.S. Cl. .................... 369/44.29; 369/44.25; 369/94
(58) Field of Classification Search ........................ None
See application file for complete search history.

(56) References Cited

U.S. PATENT DOCUMENTS 5,903,530 A * 5/1999 Tateishi et al. ............ 369/44.27
2005/0254360 A1* 11/2005 Sameshima et al. ......... 369/44.23

* cited by examiner

*Primary Examiner*—Thang V Tran
*Assistant Examiner*—Brian Butcher
(74) *Attorney, Agent, or Firm*—Birch, Stewart, Kolasch & Birch, LLP

(57) ABSTRACT

A method for setting a layer-jump point on a multilayer optical disc in an optical drive for accessing the multilayer optical disc. First, a magnetic-pole cycle value is accumulated. Next, a lag control signal of the optical drive is detected to record the magnetic-pole cycle value as a magnetic-pole basic value. Then, a magnetic-pole offset value is generated according to a phase difference between the lag control signal and an oscillating position of the multilayer optical disc. Finally, a layer-jump-point reference value, according to which the optical drive moves from one layer of the multilayer optical disc to another layer thereof to access data, is set by adding the magnetic-pole basic value to the magnetic-pole offset value.

6 Claims, 10 Drawing Sheets

METHOD FOR SETTING LAYER-JUMP POINT ON OPTICAL DISC

BACKGROUND OF THE INVENTION

1. Field of Invention

The invention relates to an optical drive control method, and, in particular, to a method for setting a layer-jump point of a multilayer optical disc.

2. Related Art

In general, when data is accessed on a double-layer optical disc by an optical drive, an optical pickup head of the optical drive has to be moved to a proper position to perform focusing and track seeking operations. As shown in FIG. 1, a double-layer optical disc 1 is disposed in an optical drive 2 (indicated by a dashed line) and held at a naturally balanced position $D_0$. The double-layer optical disc 1 has two reflective layers 11 and 12 for storing data. A laser spot of an optical pickup head 21 of the optical drive 2 is focused on the reflective layer 11 of the double-layer optical disc 1. A servo controller 24 controls an actuator 22 to move the optical pickup head 21 to change a focus position $F_0$ of the laser spot of the optical pickup head 21 (shown in FIG. 2A). In addition, the servo controller 24 also controls a spindle motor 23 to rotate the double-layer optical disc 1. The actuator 22 generates a control force $F_c$ to move the optical pickup head 21 to the proper position such that the optical pickup head 21 can move the focus position $F_0$ from the naturally balanced position $D_0$ to a focus position on the reflective layer 11 or the reflective layer 12.

As shown in FIGS. 2A and 2B, the control force $F_c$ generated by the actuator 22 is properly controlled such that the optical pickup head 21 is moved from a position $D_1$ to a position $D_2$, and the focus position $F_0$ of the optical pickup head 21 can be correctly moved from the reflective layer 11 (see FIG. 2A) to the reflective layer 12 (see FIG. 2B). In contrast, the control force $F_c$ generated by the actuator 22 may also move the optical pickup head 21 from the position $D_2$ to the position $D_1$, such that the focus position $F_0$ of the optical pickup head 21 is moved from the reflective layer 12 (see FIG. 2B) to the reflective layer 11 (see FIG. 2A). Consequently, the data may be accessed on the reflective layer 11 or the reflective layer 12 by the optical pickup head 21.

However, because the double-layer optical disc 1 does not have uniform weight distribution over its area, the rotating disc may shake up and down. As shown in FIG. 3, when the double-layer optical disc 1 is rotating, the double-layer optical disc 1 shakes up and down relative to the naturally balanced position $D_0$ such that the control force $F_c$ generated by the actuator 22 cannot move the focus position $F_0$ of the optical pickup head 21 from the reflective layer 11 to the reflective layer 12, or from the reflective layer 12 to the reflective layer 11. Thus, the data cannot be accessed on different layers of the double-layer optical disc 1 by the optical drive 2.

Consequently, it is an important subject of the invention to provide a method for setting a proper layer-jump point of the optical disc in response to the up-and-down shaking of the optical disc in order to access the data on different layers of the disc successfully.

SUMMARY OF THE INVENTION

In view of the foregoing, the invention is to provide a method for setting a layer-jump point of an optical disc in response to the up-and-down shaking of the optical disc in order to access data on different layers of the disc successfully.

To achieve the above, the invention discloses a method for setting a layer-jump point of an optical disc in an optical drive for accessing a multilayer optical disc. First, a magnetic-pole cycle value, which is generated according to a magnetic-pole position signal of a spindle motor, is accumulated. Next, a lag control signal of the optical drive is detected to record the magnetic-pole cycle value as a magnetic-pole basic value. Then, a magnetic-pole offset value is generated according to a phase difference between the lag control signal and an oscillating position of the multilayer optical disc. Finally, a layer-jump-point reference value is set by adding the magnetic-pole basic value to the magnetic-pole offset value.

As mentioned hereinabove, the method for setting the layer-jump point of the optical disc according to the invention sets the layer-jump-point reference value according to the magnetic-pole basic value and the magnetic-pole offset value. So, a proper layer-jump point is selected by this method for a multilayer optical disc in response to the up-and-down shaking of the multilayer optical disc and thus the data is accessed successfully on different layers of the multilayer optical disc.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

It is to be specified that the embodiments or examples disclosed in the disclosure are illustrated for the purpose of describing the technological features of the invention, and the double-layer optical disc is described in order to simplify the invention but not to restrict the invention. In fact, the invention can be applied to the multilayer optical disc.

Figure 4:
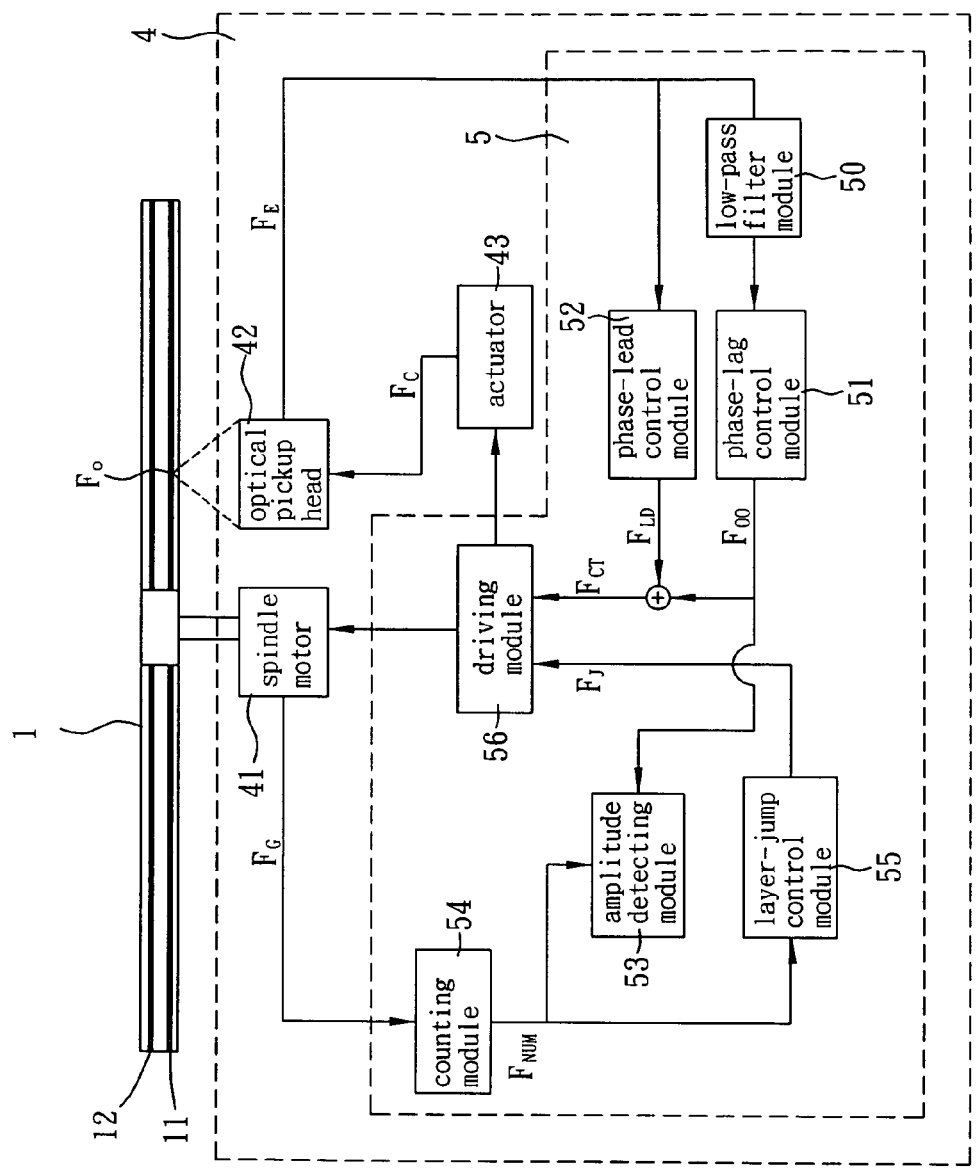
FIG. 4 is a block diagram showing an optical drive according to the preferred embodiment of the invention.

An optical drive shown in FIG. 4 adopts a method for setting a layer-jump point of an optical disc of the invention. An optical drive 4 includes a spindle motor 41, an optical pickup head 42, an actuator 43 and a servo controller 5. The servo controller 5 includes a low-pass filter module 50, a phase-lag control module 51, a phase-lead control module 52, an amplitude detecting module 53, a counting module 54, a layer-jump control module 55 and a driving module 56. In one embodiment of the invention, the servo controller 5 may include a microprocessor or a digital signal processor. The low-pass filter module 50, the phase-lag control module 51, the phase-lead control module 52, the amplitude detecting module 53, the counting module 54 and the layer-jump control module 55 are hardware circuits or digital logic circuits in the servo controller 5 and are controlled by a firmware program or firmware programs executed in the servo controller 5. The driving module 56 may be a firmware program executed in the servo controller 5.

Figure 5:
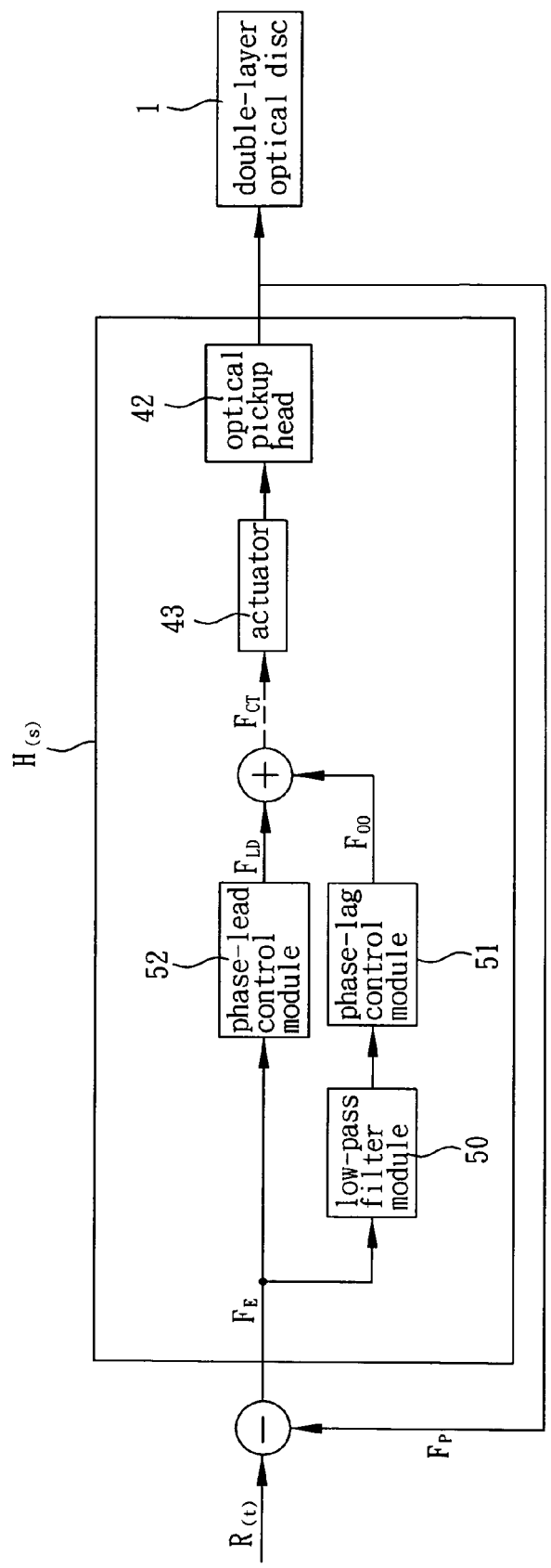
FIG. 5 is a block diagram showing a focus control system of the optical drive according to the preferred embodiment of the invention.

As shown in FIG. 5, the low-pass filter module 50, the phase-lag control module 51, the phase-lead control module 52, the actuator 43 and the optical pickup head 42 are formed in a focus control system of the optical drive 4. In this focus control system, the optical pickup head 42 reads a double-layer optical disc 1 and generates a focusing error signal $F_E$, which is sequentially processed by the low-pass filter module 50 and the phase-lag control module 51 and then a lag control signal $F_{OO}$ is thus generated. The focusing error signal $F_E$ is processed by the phase-lead control module 52, and a lead control signal $F_{LD}$ is thus generated. Thereafter, the lag control signal $F_{OO}$ is added to the lead control signal $F_{LD}$ to generate a focusing control signal $F_{CT}$, wherein the focusing error signal $F_E$ may be regarded as being generated by subtracting a predetermined focus position $F_P$ of the optical pickup head 42 on the double-layer optical disc 1 from an optical disc oscillating position $R_{(t)}$, which will be described later.

The driving module 56 drives the spindle motor 41 to rotate the double-layer optical disc 1 and adjusts a control force $F_c$ of the actuator 43 applied to the optical pickup head 42 according to the focusing control signal $F_{CT}$ so as to move the optical pickup head 42 to the proper position to shift the focus position from one layer of the double-layer optical disc 1 to the other layer of the double-layer optical disc 1. Thus, data on the other layer of the double-layer optical disc 1 may be accessed.

When the layer-jump control module 55 detects that a magnetic-pole cycle value $F_{NUM}$ has been accumulated to a layer-jump-point reference value (not shown in FIG. 4) of the servo controller 5, a layer-jump control signal $F_J$ is generated and outputted to the driving module 56. Thereafter, the driving module 56 adjusts the control force $F_c$ of the actuator 43 applied to the optical pickup head 42 according to the layer-jump control signal $F_J$, such that the optical pickup head 42 is moved to the proper position and the focus position is moved from one layer of the double-layer optical disc 1 to the other layer of the double-layer optical disc 1. Thus, the data on the other layer of the double-layer optical disc 1 can be accessed. The layer-jump-point reference value can be set in the firmware program of the servo controller 5 according to the method for setting the layer-jump point of the optical disc of the invention, such that the data can be accessed on different layers of the double-layer optical disc 1 successfully by the optical drive 4. The method for setting the layer-jump point of the optical disc according to the invention will be described with reference to the associated drawings.

Figure 6:
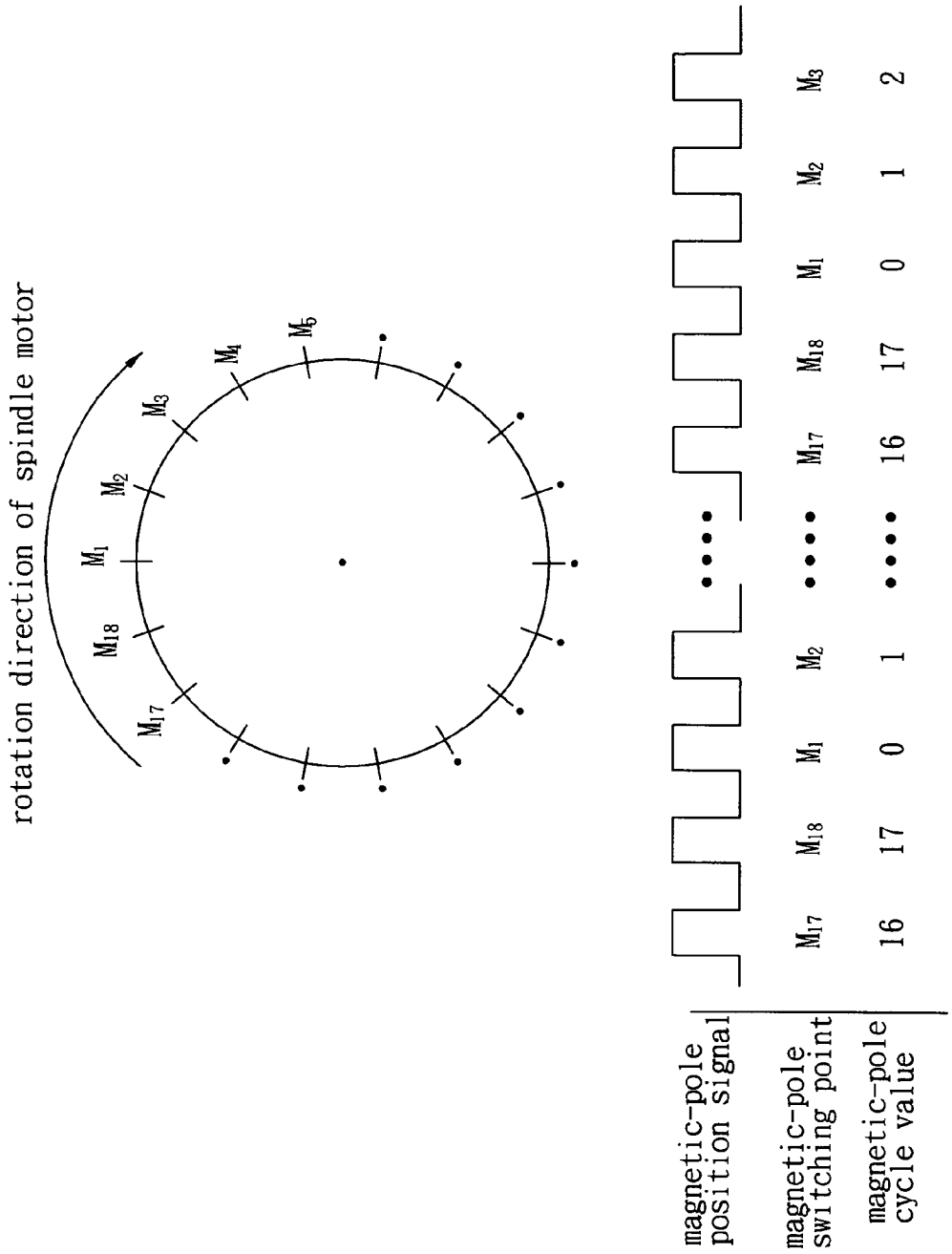
FIG. 6 is a schematic illustration showing a magnetic-pole position signal of the optical drive according to the preferred embodiment of the invention.

As shown in FIG. 4, the spindle motor 41 generates a magnetic-pole position signal $F_G$, which is a periodical square wave. When the spindle motor 41 rotates to a magnetic-pole switching point, the magnetic pole is switched such that the magnetic-pole position signal $F_G$ generates the periodical square wave when the spindle motor 41 rotates to the magnetic-pole switching point. Consequently, the counting module 54 adds 1 to the magnetic-pole cycle value $F_{NUM}$. However, when the spindle motor 41 rotates over one revolution, the counting module 54 zeros the magnetic-pole cycle value $F_{NUM}$. In the example of FIG. 6, the spindle motor 41 includes 18 magnetic-pole switching points. When the spindle motor 41 is rotating, the magnetic pole is switched 18 times from the magnetic-pole switching points M1 to M18. Thus, after the spindle motor 41 rotates one revolution, the magnetic-pole cycle value $F_{NUM}$ is accumulated from 0 to 17.

Figure 1:
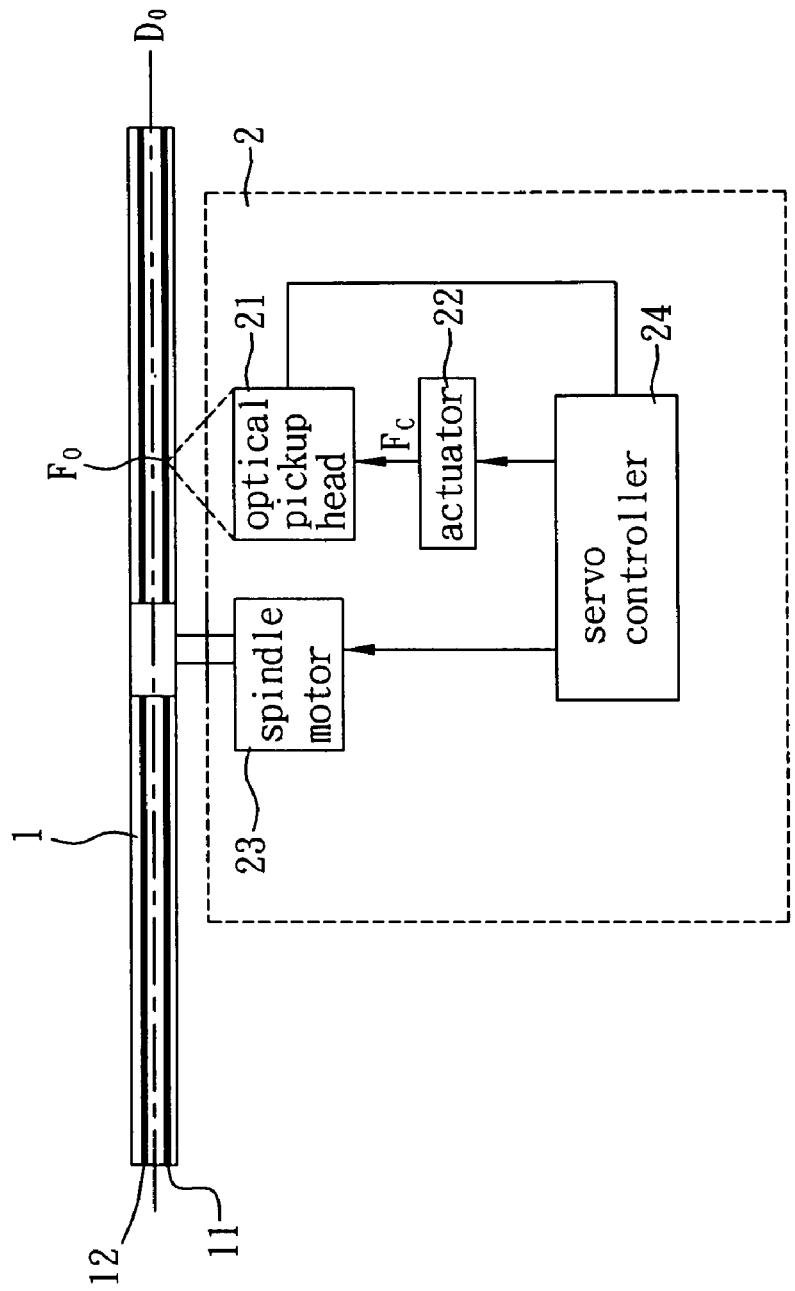
FIG. 1 is a block diagram showing a conventional optical drive.
Figure 2A:
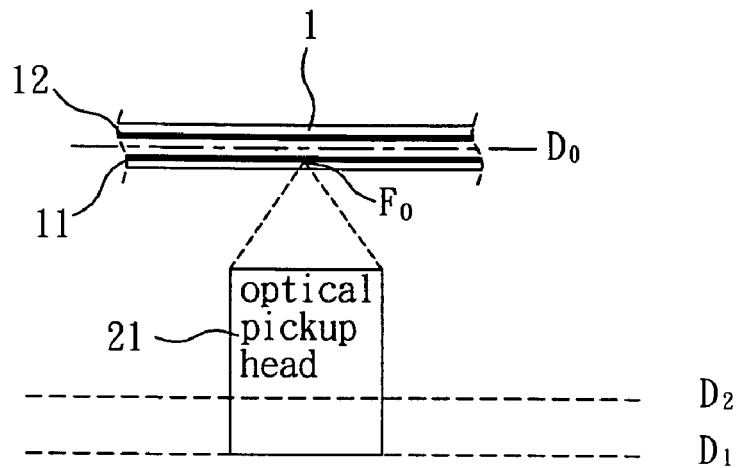
FIG. 2A is a schematic illustration showing a conventional optical pickup head.
Figure 2B:
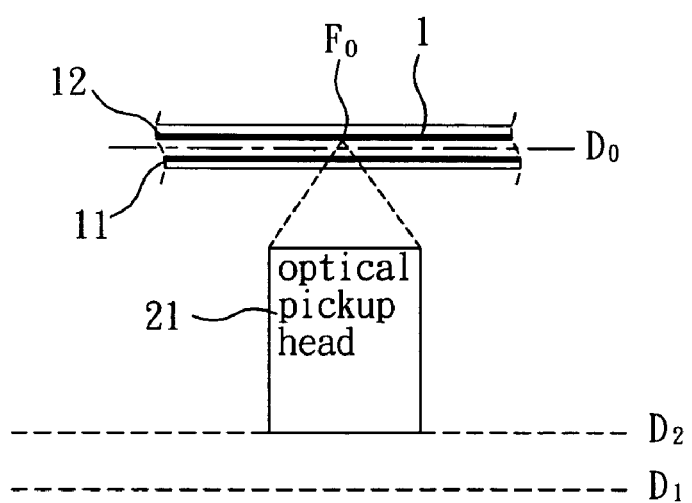
FIG. 2B is another schematic illustration showing the conventional optical pickup head.
Figure 3:
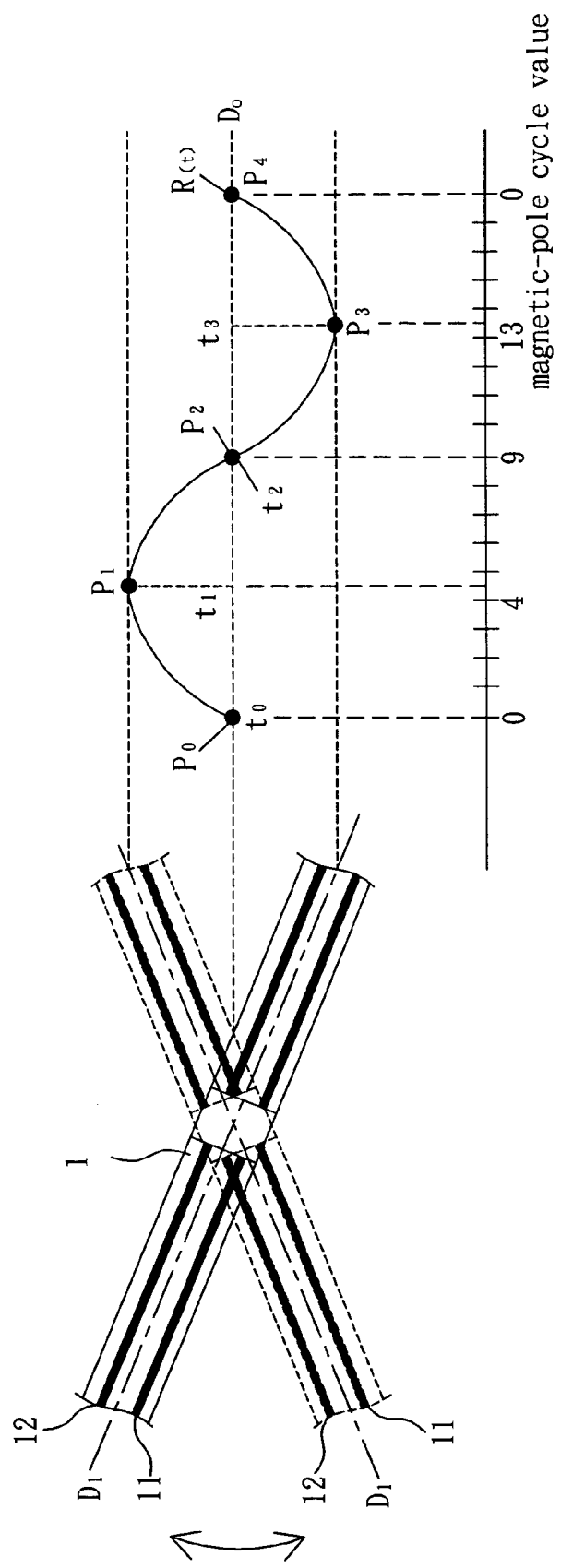
FIG. 3 is a schematic illustration showing an oscillating position of an optical disc according to a preferred embodiment of the invention.

As shown in FIG. 3, the optical disc oscillating position $R_{(t)}$ corresponds to an oscillating waveform formed by the up-and-down shaking of the horizontal position $D_1$ of the rotating double-layer optical disc 1 relative to the naturally balanced position $D_0$. When the spindle motor 41 rotates one revolution, the double-layer optical disc 1 is rotated one revolution such that the optical disc oscillating position $R_{(t)}$ oscillates from $P_0$ to $P_2$ and then to $P_4$. Assume the optical disc oscillating position $R_{(t)}$ at $P_0$ corresponds to the magnetic-pole cycle value $F_{NUM}$ as 0. Each time when the spindle motor 41 rotates one revolution, the optical disc oscillating position $R_{(t)}$ oscillates from $P_0$ to $P_2$ and then to $P_4$. The magnetic-pole cycle value $F_{NUM}$ corresponding to the optical disc oscillating position $R_{(t)}$ is accumulated from 0 to 9 and then to 17, and then zeroed and again accumulated from 0. In addition, the phase of the optical disc oscillating position $R_{(t)}$ after the magnetic-pole cycle value $F_{NUM}$ is increased by 1 leads the phase thereof before the magnetic-pole cycle value $F_{NUM}$ is increased by about 20 degrees (=360 degrees/18 magnetic poles). Thus, the optical drive 4 can utilize the magnetic-pole cycle value $F_{NUM}$ to estimate the optical disc oscillating position $R_{(t)}$. If the double-layer optical disc 1 is at the oscillating position $P_1$ or $P_3$, the relative acceleration of the up-and-down shaking of the double-layer optical disc 1 reaches the maximum such that the data cannot be easily accessed on different layers of the double-layer optical disc 1 by the optical drive 4. However, when the double-layer optical disc 1 is located at the oscillating position $P_0$ or $P_2$, the relative acceleration of the up-and-down shaking of the double-layer optical disc 1 reaches the minimum such that the data can be easily accessed on different layers of the double-layer optical disc 1 by the optical drive 4. Consequently, the invention finds the magnetic-pole cycle value $F_{NUM}$ corresponding to the minimum relative acceleration of the up-and-down shaking of the double-layer optical disc 1 and sets the magnetic-pole cycle value $F_{NUM}$ as the layer-jump-point reference value.

In addition, the Laplace transformation can be used to derive the following Equation (1) in the focus control system of FIG. 5:

$$\frac{Foo_{(s)}}{R_{(s)}} = \frac{Lpf_{(s)} \times Lag_{(s)}}{1 + H_{(s)}}, \tag{1}$$

wherein $R_{(s)}$ and $H_{(s)}$ are respectively the Laplace transformations of the transfer functions of the optical disc oscillating position $R_{(t)}$ and the focus control system, while $Foo_{(s)}$, $Lpf_{(s)}$, $Lag_{(s)}$ are respectively the Laplace transformations of the transfer functions of the lag control signal $F_{OO}$, the low-pass filter module 50 and the phase-lag control module 51.

Figure 7A:
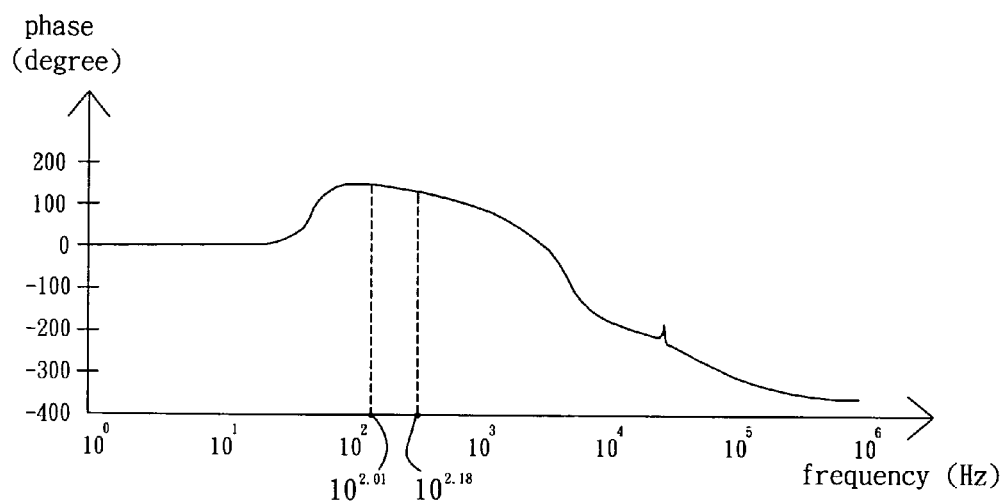
FIG. 7A is a plot showing a phase response of the optical drive according to the preferred embodiment of the invention.

According to Equation (1), the phase response relation between the optical disc oscillating position $R_{(t)}$ and the lag control signal $F_{OO}$ may be depicted, as shown in the bode plot of the optical disc oscillating position $R_{(t)}$ and the lag control signal $F_{OO}$ in FIG. 7A, wherein the vertical axis represents the phase and the horizontal axis represents the frequency.

Figure 7B:
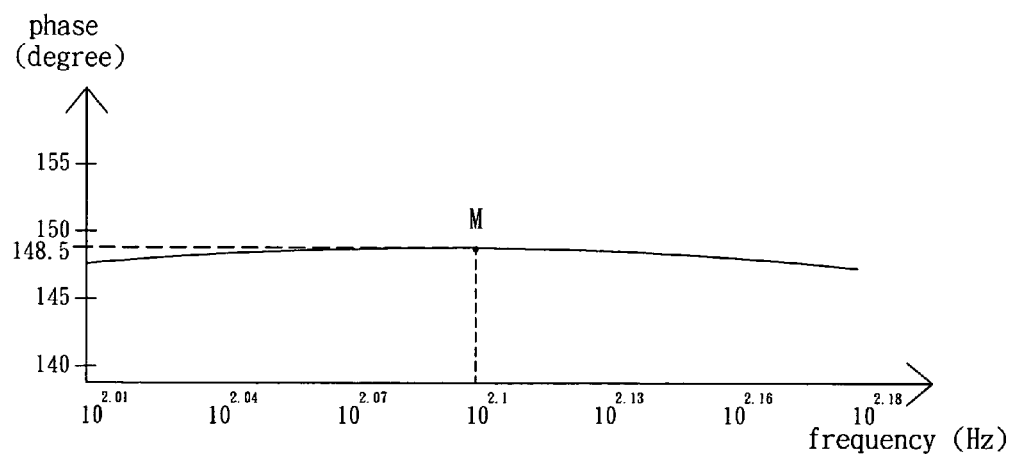
FIG. 7B is a partially enlarged view showing the plot of FIG. 7A.

For example, when the rotating speed of the spindle motor 41 of the optical drive 4 causes the oscillating frequency of the double-layer optical disc 1 to range from 126 Hz to 128 Hz, the phase of the lag control signal $F_{OO}$ leads the phase of the optical disc oscillating position $R_{(t)}$ by about +148.5 degrees, as shown at the point M in FIG. 7B, which is a partially enlarged view of FIG. 7A. Consequently, a fixed magnetic-pole offset value is set in the firmware of the servo controller 5 according to the phase response relation between the optical disc oscillating position $R_{(t)}$ and the lag control signal $F_{OO}$ obtained from Equation (1). The magnetic-pole offset value is also determined according to the number of magnetic-pole switching points included in the spindle motor 41. For example, when the oscillating frequency of the double-layer optical disc 1 ranges from 126 Hz to 128 Hz, the phase of the lag control signal $F_{OO}$ leads that of the optical disc oscillating position $R_{(t)}$ by about +148.5 degrees. If the spindle motor 41 includes 18 magnetic-pole switching points, it represents that the phase difference is 20 degrees when the magnetic-pole cycle value $F_{NUM}$ is accumulated by 1, as will be understood from the above-mentioned description. Thus, the firmware of the servo controller 5 sets the magnetic-pole offset value as 7 (=148.5/20).

Figure 8A:
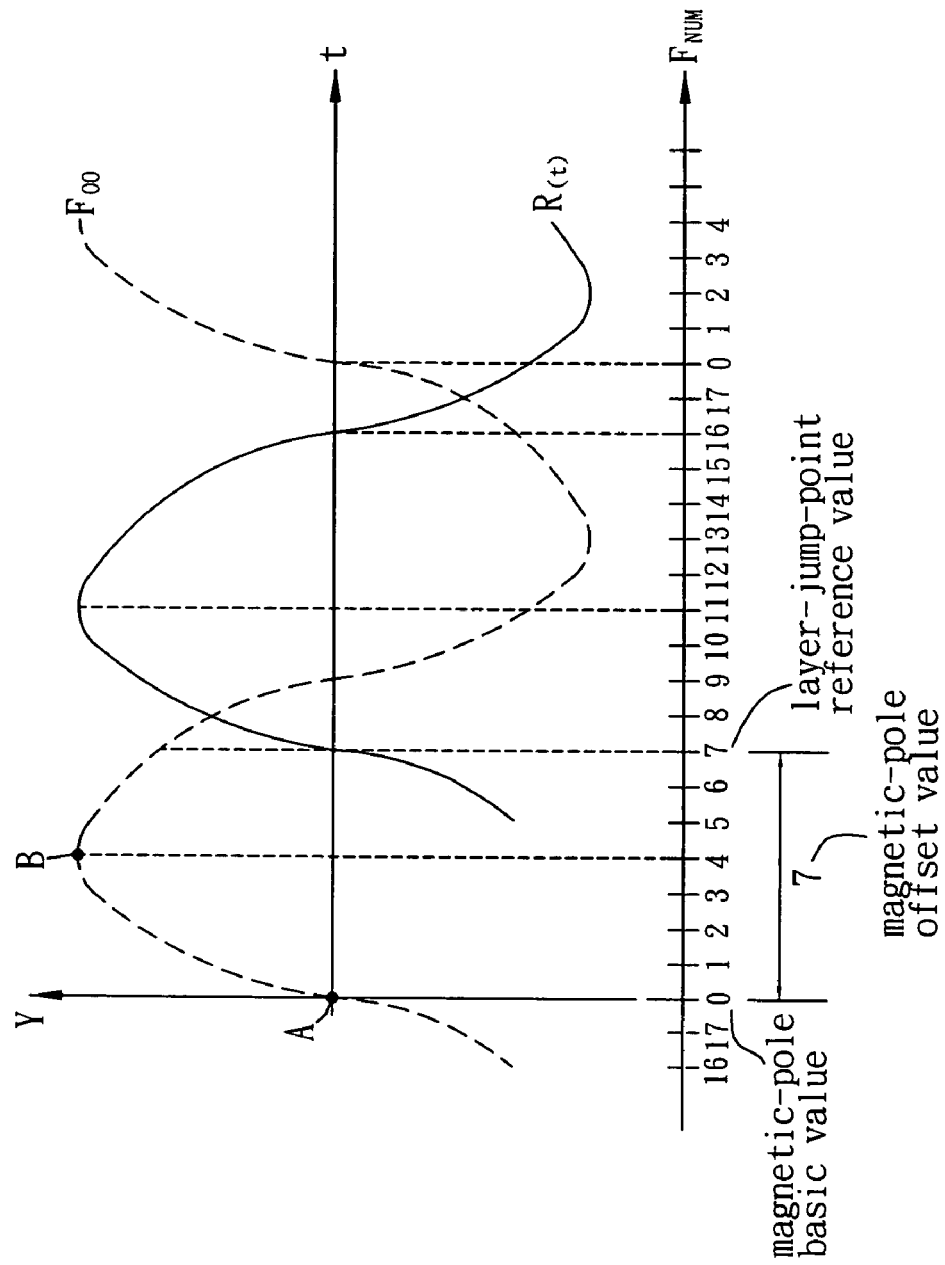
FIG. 8A is a schematic illustration showing a method for selecting a layer-jump point of the optical disc according to the preferred embodiment of the invention.

The counting module 54 receives the magnetic-pole position signal $F_G$ generated by the spindle motor 41 so as to accumulate the magnetic-pole cycle value $F_{NUM}$ and thus to output the magnetic-pole cycle value $F_{NUM}$ to the amplitude detecting module 53 and the layer-jump control module 55. The amplitude detecting module 53 detects the amplitude value of the lag control signal $F_{OO}$. As shown in FIG. 8A, when the amplitude detecting module 53 detects that the lag control signal $F_{OO}$ reaches the zero amplitude (e.g., at point A), the amplitude detecting module 53 records the magnetic-pole cycle value $F_{NUM}$ as the magnetic-pole basic value (i.e., 0) in the firmware of the servo controller 5. The firmware of the servo controller 5 adds the magnetic-pole basic value to the magnetic-pole offset value to obtain the layer-jump-point reference value. As shown in FIG. 8A, the magnetic-pole basic value (=0) and the magnetic-pole offset value (=7) are summated to obtain the layer-jump-point reference value as 7. Thus, when the magnetic-pole cycle value $F_{NUM}$ equals to 7, the relative acceleration of the up-and-down shaking of the double-layer optical disc 1 reaches the minimum.

Figure 8B:
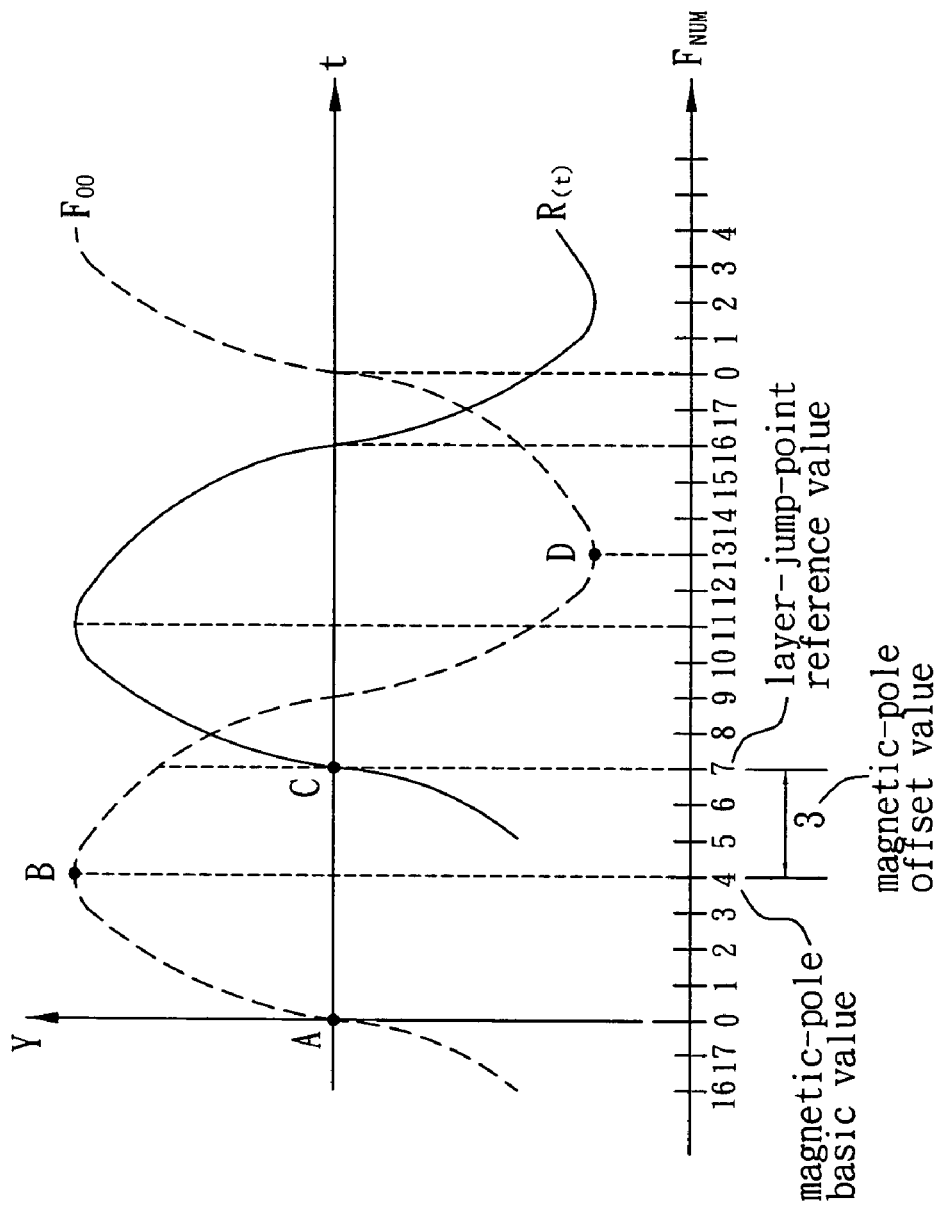
FIG. 8B is another schematic illustration showing the method for selecting the layer-jump point of the optical disc according to the preferred embodiment of the invention.

In addition, if the magnetic-pole basic value is set according to other amplitude points of the lag control signal $F_{OO}$, the magnetic-pole offset value has to be corrected in order to set the layer-jump-point reference value correctly and to find the point at which the relative acceleration of the up-and-down shaking of the double-layer optical disc 1 reaches the minimum. In another embodiment of the invention, as shown in FIG. 8B, when the detected amplitude of the lag control signal $F_{OO}$ reaches the maximum (i.e., at point B), the magnetic-pole basic value is set as 4. If the spindle motor 41 contains 18 magnetic-pole switching points and the oscillating frequency of the double-layer optical disc 1 ranges from 126 Hz to 128 Hz, the phase difference between point B and the point at which the relative acceleration of the up-and-down shaking of the double-layer optical disc 1 reaches the minimum is about 58.5 (=148.5−90) degrees. That is, the difference between the magnetic-pole cycle values $F_{NUM}$ is 3 (about 58.5/20), and the magnetic-pole offset value is thus set as 3. Then, the magnetic-pole basic value and the magnetic-pole offset value are summated to get the layer-jump-point reference value as 7 so that the point, at which the relative acceleration of the up-and-down shaking of the double-layer optical disc 1 reaches the minimum, can be found at point C of the optical disc oscillating position $R_{(t)}$. Similarly, if it is optional to record the magnetic-pole basic value at point D when the amplitude of the lag control signal $F_{OO}$ reaches the minimum, the magnetic-pole offset value may be set according to the phase difference between point D and the point at which the relative acceleration of the up-and-down shaking of the double-layer optical disc 1 reaches the minimum. Then, the magnetic-pole basic value and the magnetic-pole offset value are summed up to get the layer-jump-point reference value. When the magnetic-pole cycle value $F_{NUM}$ is accumulated to reach the layer-jump-point reference value, the optical drive 4 can move from one layer of the double-layer optical disc 1 to the other layer of the double-layer optical disc 1 to access the data on the other layer of the double-layer optical disc 1.

Figure 9:
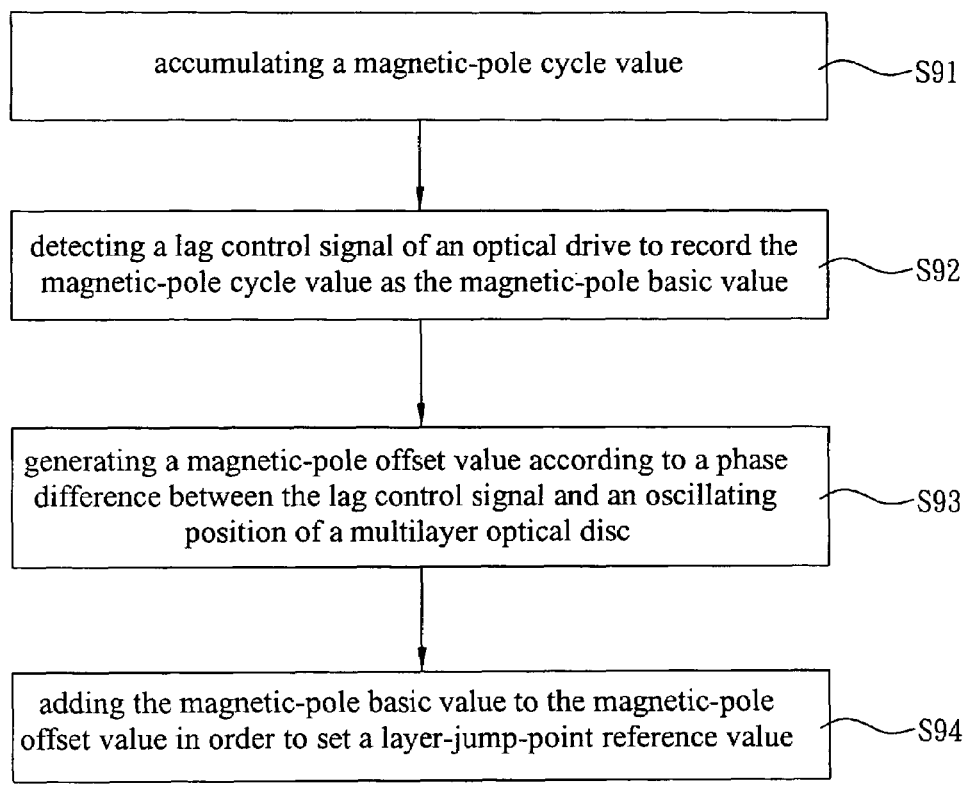
FIG. 9 is a flow chart showing the method for setting the layer-jump point of the optical disc according to the preferred embodiment of the invention.

FIG. 9 is a flow chart showing the method for setting the layer-jump point of the optical disc according to the preferred embodiment of the invention. The method of the invention includes steps S91 to S94. In step S91, a magnetic-pole cycle value generated according to a magnetic-pole position signal of a spindle motor is accumulated. A lag control signal of an optical drive is detected to record the magnetic-pole cycle value as the magnetic-pole basic value in step S92. Then, a magnetic-pole offset value is generated according to a phase difference between the lag control signal and an oscillating position of a multilayer optical disc in step S93. Finally, the magnetic-pole basic value is added to the magnetic-pole offset value in order to set a layer-jump-point reference value in step S94. Thus, when the magnetic-pole cycle value is accumulated to the layer-jump-point reference value, the optical drive can correctly move from one layer of the multilayer optical disc to another layer of the multilayer optical disc to access the data on the another layer of the multilayer optical disc.

In summary, the method for setting the layer-jump point of the optical disc of the invention provides the layer-jump-point reference value set according to the phase response relation between the lag control signal of the optical drive and the oscillating position of the multilayer optical disc. So, the method can provide a proper layer-jump point for a multilayer optical disc selected in response to the up-and-down shaking of the disc and thus the data can be accessed on different layers of the disc successfully.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for setting a layer-jump point of a multilayer optical disc in an optical drive for accessing the multilayer optical disc, the method comprising the steps of:

accumulating a magnetic-pole cycle value, which is generated according to a magnetic-pole position signal of a spindle motor;

detecting a lag control signal of the optical drive to record the magnetic-pole cycle value as a magnetic-pole basic value;

generating a magnetic-pole offset value according to a phase difference between the lag control signal and an oscillating position of the multilayer optical disc; and setting a layer-jump-point reference value by adding the magnetic-pole basic value to the magnetic-pole offset value.

2. The method according to claim 1, further comprising the step of:

moving the optical drive from one layer of the multilayer optical disc to another layer of the multilayer optical disc to access data on the another layer when the magnetic-pole cycle value is accumulated to get the layer-jump-point reference value.

3. The method according to claim 1, wherein the oscillating position of the multilayer optical disc is generated by adding a focusing error signal to a predetermined focus position of the optical drive on the multilayer optical disc.

4. The method according to claim 1, wherein the magnetic-pole cycle value is recorded as the magnetic-pole basic value when an amplitude of the lag control signal reaches a specific amplitude value.

5. The method according to claim 4, wherein the specific amplitude value equals zero, a maximum amplitude of the lag control signal or a minimum amplitude of the lag control signal.

6. The method according to claim 1, wherein the step of generating the magnetic-pole offset value is performed, according to a phase response relation and a rotating speed of the optical drive, to determine the phase difference.

* * * * *